(12) United States Patent
Mann et al.

(10) Patent No.: US 8,964,529 B2
(45) Date of Patent: Feb. 24, 2015

(54) FAST ACCEPTANCE OF DIAMETER PEER FAILOVER

(75) Inventors: Robert A. Mann, Carp (CA); Eric Colaviti, Courcouronnes (FR)

(73) Assignee: Alcatel Lucent, Boulogne-Billancourt (FR)

( * ) Notice: Subject to any disclaimer, the term of this patent is extended or adjusted under 35 U.S.C. 154(b) by 260 days.

(21) Appl. No.: 13/602,511

(22) Filed: Sep. 4, 2012

(65) Prior Publication Data

US 2014/0064183 A1    Mar. 6, 2014

(51) Int. Cl.
*H04L 12/26* (2006.01)

(52) U.S. Cl.
USPC ........................... 370/218; 370/242; 709/227

(58) Field of Classification Search
None
See application file for complete search history.

(56) References Cited

U.S. PATENT DOCUMENTS

| | | | | |
|---|---|---|---|---|
| 8,483,233 B2 * | 7/2013 | Craig et al. | | 370/401 |
| 8,499,336 B2 * | 7/2013 | Alex et al. | | 726/3 |
| 8,726,068 B2 * | 5/2014 | Korhonen et al. | | 714/4.11 |
| 2010/0299451 A1 * | 11/2010 | Yigang et al. | | 709/241 |
| 2011/0035413 A1 * | 2/2011 | Bessis et al. | | 707/799 |
| 2012/0221899 A1 * | 8/2012 | Cervenak et al. | | 714/48 |

OTHER PUBLICATIONS

Sang Keun Yoo, Hyun Gon Kim, Seung Won Sohn, Enhancement of failover using application layer watchdog and SCTP heartbeat in diameter, Proceedings of the 7th CDMA international conference on Mobile communications, Oct. 29-Nov. 1, 2002, Seoul, Korea.*

* cited by examiner

*Primary Examiner* — Brian Roberts
(74) *Attorney, Agent, or Firm* — Kramer Amado P.C.

(57) ABSTRACT

Various exemplary embodiments relate to a method performed by a network node, the method including: receiving a connection request from a peer network node including a peer identifier; determining that the received peer identifier matches an identifier of an existing peer; sending a verification message to the existing peer; setting a timer; when a response the verification message is received before the timer expires: cancelling the timer; and rejecting the received connection request; when the timer expires: closing a connection to the existing peer; and accepting the new connection from the new peer.

20 Claims, 3 Drawing Sheets

FAST ACCEPTANCE OF DIAMETER PEER FAILOVER

TECHNICAL FIELD

Various exemplary embodiments disclosed herein relate generally to telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

Within these communication networks, redundancy may be used in order to prevent a network failure. Often, redundant network nodes use the DIAMETER protocol to communicate with peer network nodes. When a failure in a redundant network node occurs it may be desirable to have a quick change over of DIAMETER protocol connections.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a network node, the method including: receiving a connection request from a peer network node including a peer identifier; determining that the received peer identifier matches an identifier of an existing peer; sending a verification message to the existing peer; setting a timer; when a response to the verification message is received before the timer expires: cancelling the timer; and rejecting the received connection request; when the timer expires: closing a connection to the existing peer; and accepting the new connection from the new peer.

Various exemplary embodiments relate to a method performed by a network node, the method comprising: receiving a first connection request from a peer network node including a first peer identifier; determining that the first received peer identifier matches an identifier of an existing peer; sending a first verification message to the existing peer; setting a first timer; and after the first timer expires, closing a connection to the existing peer and accepting the new connection from the new peer.

Various exemplary embodiments relate to tangible and non-transitory machine-readable storage medium encoded with instructions for execution by a network node, the tangible and non-transitory machine-readable storage medium including: instructions for receiving a connection request from a peer network node including a peer identifier; instructions for determining that the received peer identifier matches an identifier of an existing peer; instructions for sending a verification message to the existing peer; instructions for setting a timer; instructions for when a response to the verification message is received before the timer expires: cancelling the timer; and rejecting the received connection request; instructions for when the timer expires: closing a connection to the existing peer; and accepting a new connection from the new peer.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Figure 1:
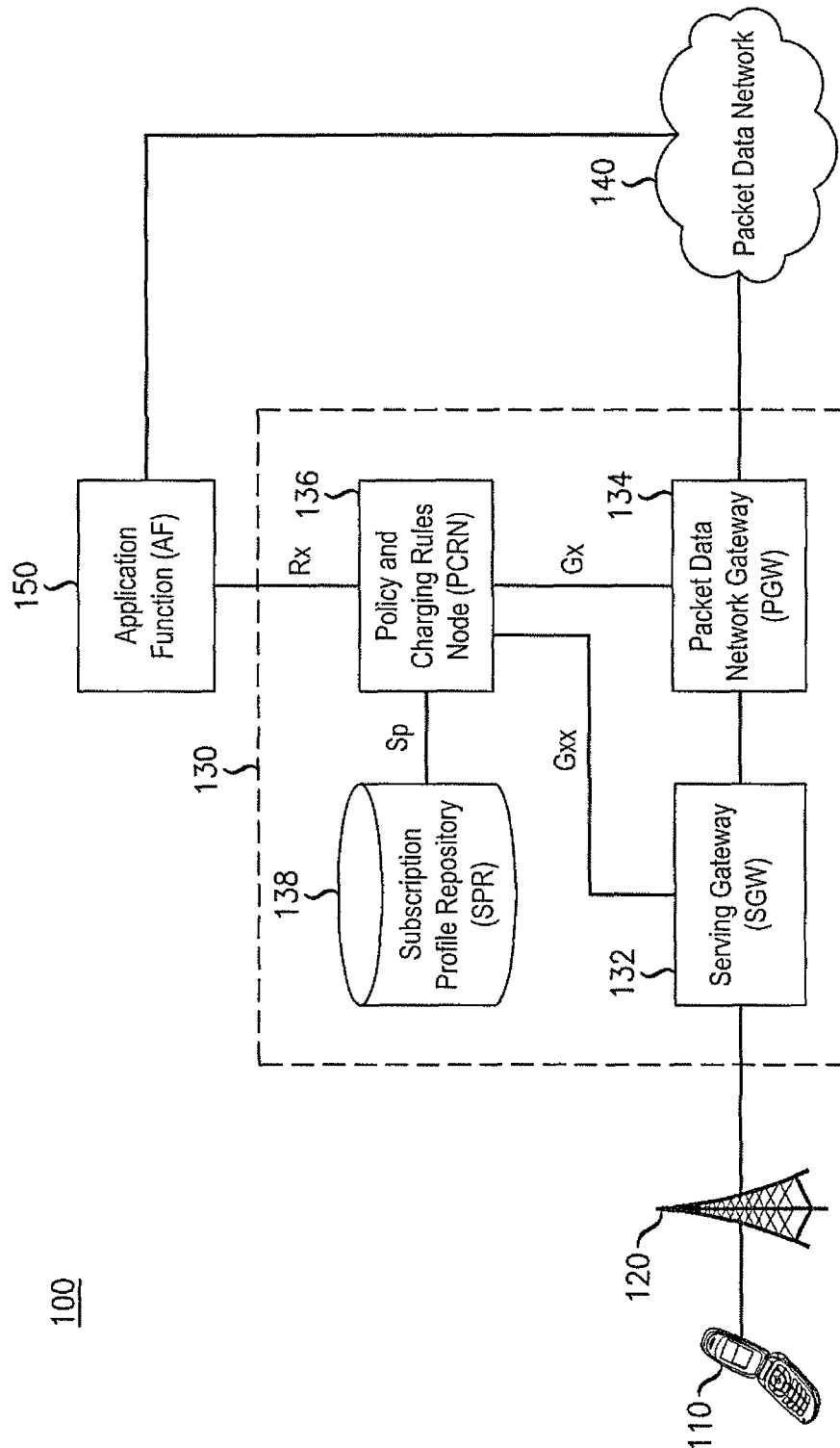
FIG. 1 illustrates an exemplary subscriber network for providing various data services.

FIG. 1 illustrates an exemplary subscriber network 100 for providing various data services. Exemplary subscriber network 100 may be telecommunications network or other network for providing access to various services. Exemplary subscriber network 100 may include user equipment 110, base station 120, evolved packet core (EPC) 130, packet data network 140, and application function (AF) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (POW) 134, a policy and charging rules node (PCRN) 136, and a subscription profile repository (SPR) 138.

Serving gateway (SOW) 132 may be a device that provides gateway access to the EPC 130. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. POW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Policy and charging rules node (PCRN) 136 may be a device or group of devices that receives requests for application services, generates PCC rules, and provides PCC rules to the PGW 134 and/or other PCENs (not shown). PCRN 136 may be in communication with AF 150 via an Rx interface. As described in further detail below with respect to AF 150, PCRN 136 may receive an application request in the form of an Authentication and Authorization Request (AAR) 160 from AF 150, Upon receipt of AAR 160, PCRN 136 may generate at least one new PCC rule for fulfilling the application request 160.

PCRN 136 may also be in communication with SGW 132 and PGW 134 via a Gxx and a Gx interface, respectively. PCRN 136 may receive an application request in the form of a credit control request (CCR) (not shown) from SGW 132 or POW 134. As with AAR 160, upon receipt of a CCR, PCRN may generate at least one new PCC rule for fulfilling the application request 170. In various embodiments, AAR 160 and the CCR may represent two independent application requests to be processed separately, while in other embodiments, AAR, 160 and the CCR may carry information regarding a single application request and PCRN 136 may create at least one PCC rule based on the combination of AAR 160 and the CCR. In various embodiments, PCRN 136 may be capable of handling both single-message and paired-message application requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an authentication and authorization request (AAR) 160 according to the Diameter protocol, to notify the PCRN 136 that resources should be allocated for the application service. This application request message may include information such as an identification of the subscriber using the application service, an IP address of the subscriber, an APN for an associated IP-CAN session, and/or an identification of the particular service data flows that must be established in order to provide the requested service. AF 150 may communicate such an application request to the PCRN 136 via the Rx interface.

The subscriber network 100 may include network nodes that have redundant elements in order to compensate for equipment failures and equipment unavailability. Such redundant elements may be collocated or be located at different geographic locations. Typically the redundant elements that are collocated would have the same IP address and DIAMETER ID. If the redundant elements are at different locations, then the IP addresses may be different, but they would have the same DIAMETER ID. In either case, the DIAMETER ID for the redundant elements will be the same. Such an arrangement provides for simplicity in managing the network, rather than requiring a network manager to store and maintain information relating to a separate IP address and DIAMETER ID for redundant elements.

Using a single DIAMETER ID for redundant elements may create an issue when there is a problem with the primary element. When the primary element fails and the backup element is utilized, the backup element may send a DIAMETER connection request to a peer node. The peer node already may have an active DIAMETER connection (or at least an active connection with which a problem has not yet been detected) with the same DIAMETER ID, therefore the peer node rejects the DIAMETER connection request. This may prevent or delay the backup element from resuming the functions of the primary element. Eventually the peer node will detect the failure of the primary node, but such detection could take from many seconds to upwards of a minute. Because it is common for elements using DIAMETER to exchange thousands of messages per second, many thousands of messages could be lost during a failover between redundant elements.

The DIAMETER protocol includes a detailed algorithm for detecting transport failures. When there is no communication with a peer node for a period of time, a network node may send a watchdog or verification message to the peer node. The node then waits to receive a reply from the peer node. If such a response is not received in a specified amount of time, then a connection failure is indicated.

According to the DIAMETER protocol, the minimum time to wait before sending a watchdog message is 4 seconds, but may be as much as 30 seconds. Further, the node may wait for 4 to 30 seconds for the response. This leads to a minimum time to detect a failure of about 8 seconds. The time to detect the failure can be up to approximately 60 seconds. During this time many thousands of DIAMETER messages may be lost. Currently, network nodes may failover from the primary element to the backup element in about 0.05 to 0.5 seconds. Accordingly, the backup element may be provisioned and ready to function, but the backup element has to wait until the DIAMETER connection failure is detected and then reestablished.

Figure 2:
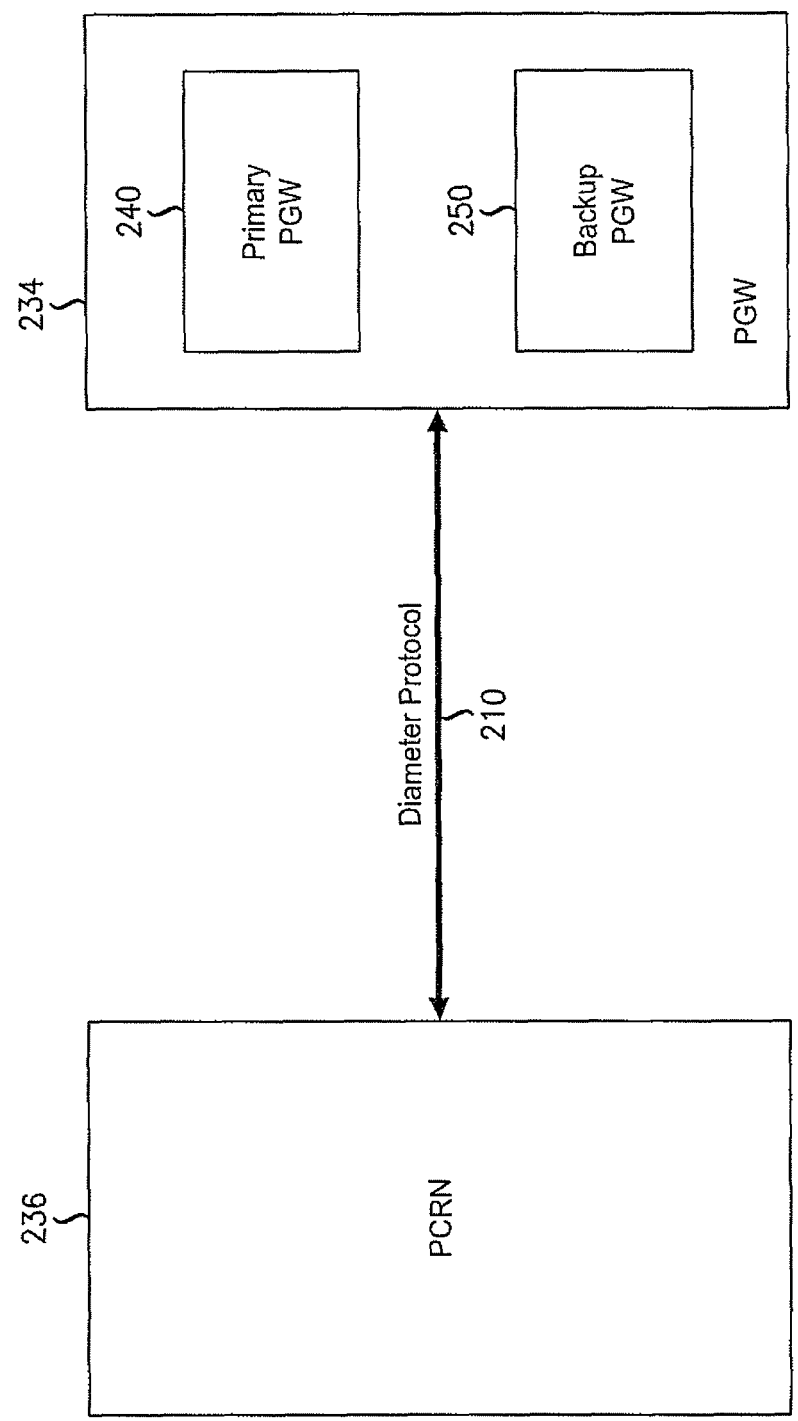
FIG. 2 illustrates a DIAMETER protocol connection between a PCRN and redundant PGW.

FIG. 2 illustrates a DIAMETER protocol connection between a PCRN and redundant PGW. A PCRN 236 may be connected to a PGW 234 via a DIAMETER protocol connection 210. The PGW 234 may include a primary PGW 240 and a backup POW 250. The primary PGW 240 and backup PGW 250 may be collocated or may be geographically separated. The PGW 234 may have a single DIAMETER ID that may be used by both the primary PGW 240 and the backup PGW 250. The PGW may also have a single IP address used by both the primary PGW 240 and the backup PGW 250, but separate IP addresses may also be assigned to the primary PGW 240 and the backup PGW 250.

Figure 3:
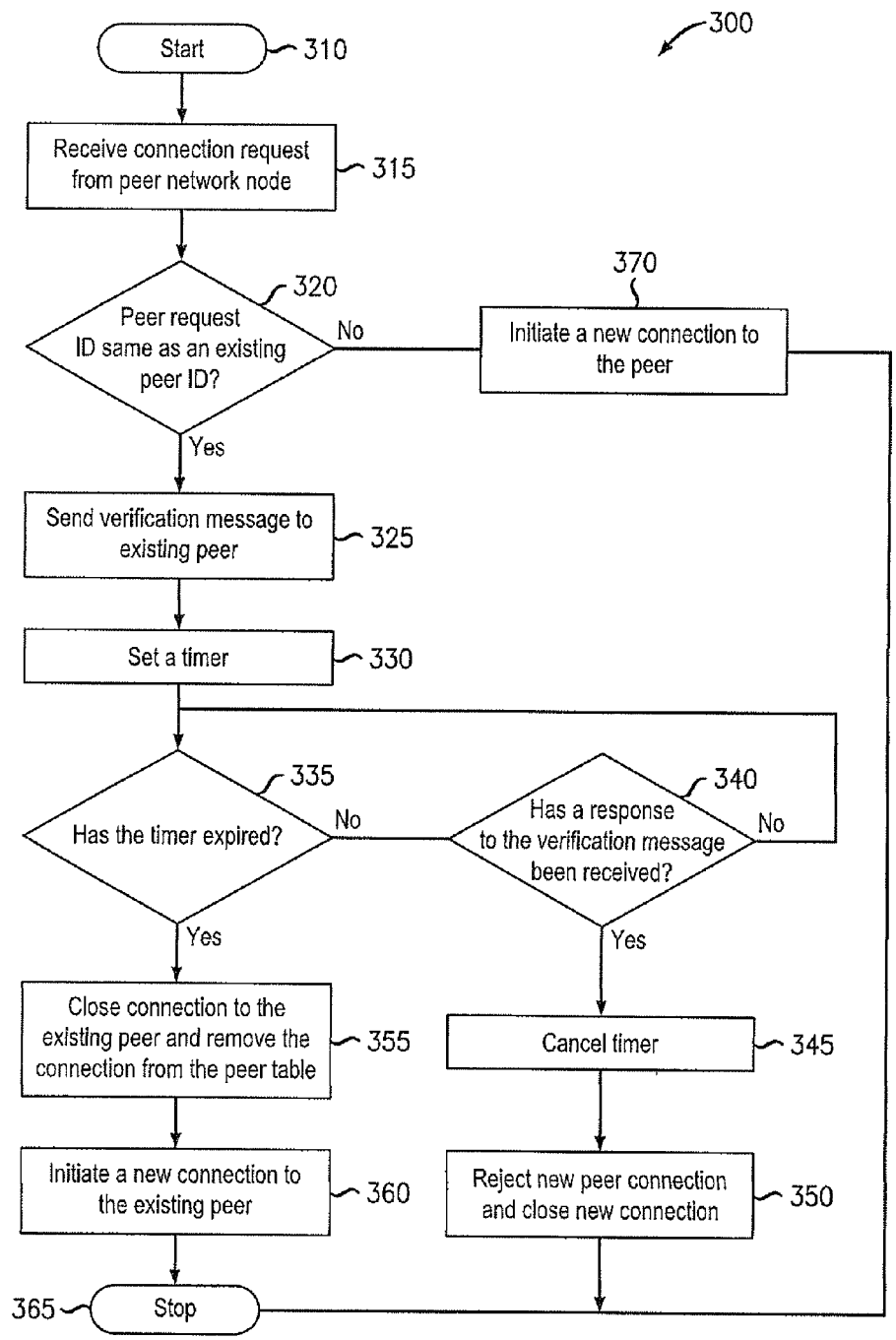
FIG. 3 illustrates a flow diagram illustrating managing DIAMETER connections when a redundant element fails.

FIG. 3 illustrates a flow diagram illustrating managing DIAMETER connections when a redundant element fails. For example, if in FIG. 2, the primary PGW 240 fails and the backup PGW takes over the function of the PGW 234, the DIAMETER connection 210 may be reestablished according to the steps illustrated in the flow diagram of FIG. 3.

The method 300 of FIG. 3 starts at 310. Next, a node may receive a DIAMETER connection request from a peer network node 315. Next, the method may determine if a DIAMETER ID of the peer DIAMETER connection request is the same as an existing peer connection DIAMETER ID 320. If not, then the method accepts the new connection from the peer 370. Then the method ends 365.

If a DIAMETER ID of the peer DIAMETER connection request is the same as an existing peer connection DIAMETER ID, then the node immediately may send a watchdog or verification message to the existing peer 325. Typically, such a watchdog message would not be sent until a specified amount of time had passed since a communication was received from the peer node, but the conflicting DIAMETER ID's may indicate a failover condition, so the watchdog message may be sent immediately.

Next, a timer may be set 330. The length of this timer may preferably be short in order to minimize the number of DIAMETER messages that may be lost during a failover. Further, the length of the timer may be determined based upon the transit time between the node and the peer node.

Next, the node may determine if the timer has expired 335. If not, then the node may determine if a response to the watchdog message has been received. If not, then the node may return to step 335 to again determine if the timer has expired. If a response to the watchdog message has been received, then the node may cancel the timer 345. Next, the node may reject the new peer connection and close the new peer connection 350. The method then ends at 365.

If the timer has expired, the node may close the connection to the existing peer node and remove the connection from a peer table 344. Each node may include a peer table that lists each peer node that the node may be connected to as well as any other pertinent information regarding the connections. Next, the node may accept the new DIAMETER connection from the new peer node 360. Then the method ends at 365.

The method 300 may be implemented in any network node that uses a DIAMETER protocol. Further, the method 300 may be implemented by using programming instructions stored on a media that is then executed by a processor. The media may be any type of available storage media. The processor may be any type of processor that may execute the programming instructions.

While a DIAMETER watchdog message has been described in the embodiments above as the verification message, other types of verification messages may be used. For example, an innocuous message may be sent to the peer node that does not require any specific action, but the lack of receipt of a response to such a message may indicate a failover situation.

Further, while the DIAMETER protocol has been described as the communication protocol between nodes, the embodiments described may also be applied to any persistent communication protocol used between nodes where at least one of the nodes implements redundant elements.

Further, while a LTE communication system is used as an example in the described embodiments, other communication systems may also use the above described methods and systems.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a network node, the method comprising:
   receiving a connection request from a peer network node including a peer identifier;
   determining that the received peer identifier matches an identifier of an existing peer;
   sending a verification message to the existing peer;
   setting a timer;
   when a response to the verification message is received before the timer expires:
      cancelling the timer; and
      rejecting the received connection request;
   when the timer expires:
      closing a connection to the existing peer; and
      accepting a new connection to a new peer.

2. The method of claim 1, wherein a connection between the network node and the peer network node is a persistent connection.

3. The method of claim 1, wherein a connection between the network node and the peer network node uses the DIAMETER protocol.

4. The method of claim 3, wherein the verification message is a DIAMETER watchdog message.

5. The method of claim 1, wherein the peer network node includes redundant elements including a primary element and a backup element and wherein the primary and backup elements use the same peer identifier.

6. The method of claim 5, wherein the network node receives the connection request from the peer network node when a primary element fails and the backup element replaces the primary element.

7. The method of claim 1, wherein closing the connection to the existing peer includes removing the connection from a peer table.

8. The method of claim 1, wherein rejecting the received connection request includes closing a connection associated with the received connection request.

9. The method of claim 1, wherein the network node and the peer network node implement DIAMETER.

10. A method performed by a network node, the method comprising:
    receiving a first connection request from a peer network node including a first peer identifier;
    determining that the first received peer identifier matches an identifier of an existing peer;
    sending a first verification message to the existing peer;
    setting a first timer; and
    after the first timer expires, closing a connection to the existing peer and accepting a new connection from a new peer.

11. The method of claim 10, further comprising:
    receiving a second connection request from a peer network node including a second peer identifier;
    determining that the second received peer identifier matches an identifier of an existing peer;
    sending a second verification message to the existing peer;
    setting a second timer;
    receiving a second response to the second verification message before the timer expires;
    cancelling the second timer; and
    rejecting the second received connection request.

12. A tangible and non-transitory machine-readable storage medium encoded with instructions for execution by a network node, the tangible and non-transitory machine-readable storage medium comprising:
    instructions for receiving a connection request from a peer network node including a peer identifier;
    instructions for determining that the received peer identifier matches an identifier of an existing peer;
    instructions for sending a verification message to the existing peer;
    instructions for setting a timer;
    instructions for when a response to the verification message is received before the timer expires:
       cancelling the timer; and
       rejecting the received connection request;
    instructions for when the timer expires:
       closing a connection to the existing peer; and
       accepting a new connection from a new peer.

13. The tangible and non-transitory machine-readable storage medium of claim 12, wherein the connection between the network node and the peer node is a persistent connection.

14. The tangible and non-transitory machine-readable storage medium of claim 12, wherein a connection between the network node and the peer network node uses the DIAMETER protocol.

15. The tangible and non-transitory machine-readable storage medium of claim 14, wherein the verification message is a DIAMETER watchdog message.

16. The tangible and non-transitory machine-readable storage medium of claim 12, wherein the peer network node includes redundant elements including a primary element and a backup element and wherein the primary and backup elements use the same peer identifier.

17. The tangible and non-transitory machine-readable storage medium of claim 16, wherein the network node receives the connection request from the peer network node when a primary element fails and the backup element replaces the primary element.

18. The tangible and non-transitory machine-readable storage medium of claim 12, wherein instructions for closing the connection to the existing peer includes instructions for removing the connection from a peer table.

19. The tangible and non-transitory machine-readable storage medium of claim 12, wherein instructions for rejecting the received connection request includes instructions for closing a connection associated with the received connection request.

20. The tangible and non-transitory machine-readable storage medium of claim 12, wherein the network node and the other network node is one of a policy and charging rules node (PCRN), serving gateway (SGW), and packet data network gateway (PGW).

* * * * *